(12) United States Patent
Yang et al.

(10) Patent No.: US 10,671,209 B2
(45) Date of Patent: Jun. 2, 2020

(54) TOUCH DEVICE AND METHOD OF DRIVING TOUCH DEVICE

(71) Applicant: Au Optronics Corporation, Hsinchu (TW)

(72) Inventors: Woei-Chyuan Yang, Hsinchu (TW); Sheng-Chin Fan, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/147,885

(22) Filed: Oct. 1, 2018

(65) Prior Publication Data

US 2019/0377453 A1    Dec. 12, 2019

(30) Foreign Application Priority Data

Jun. 12, 2018   (TW) .............................. 107120240 A (51) Int. Cl.
   *G06F 3/041*      (2006.01)
   *G06F 3/044*      (2006.01)
(52) U.S. Cl.
   CPC ............ *G06F 3/0416* (2013.01); *G06F 3/044* (2013.01); *G06F 2203/04108* (2013.01)

(58) Field of Classification Search
   CPC ...... G06F 3/044; G06F 3/0412; G06F 3/0416; G06F 2203/04105; G06F 2203/04106; G06F 3/041
   See application file for complete search history.

(56) References Cited

U.S. PATENT DOCUMENTS

| 10,007,367 | B2 | 6/2018 | Wu et al. | |
| 2015/0185940 | A1* | 7/2015 | Han | G06F 3/044 345/174 |
| 2016/0291784 | A1* | 10/2016 | Zhai | G06F 3/0416 |
| 2017/0060310 | A1* | 3/2017 | Gwon | G06F 3/0412 |

FOREIGN PATENT DOCUMENTS

| CN | 107153492 | 9/2017 |
| CN | 206497442 | 9/2017 |

* cited by examiner

*Primary Examiner* — Gerald Johnson
(74) *Attorney, Agent, or Firm* — JCIPRNET (57) ABSTRACT

A touch device is provided. The touch device includes a first touch electrode, a plurality of second touch electrodes, a first main connecting pad, at least one first sub-connecting pad, and a plurality of second connecting pads. The area of the first touch electrode is smaller than the area of each second touch electrode. The first main connecting pad is electrically connected to the first touch electrode. The at least one first sub-connecting pad is electrically connected to the first touch electrode. The second connecting pads are respectively electrically connected to the second connecting pads.

18 Claims, 9 Drawing Sheets

TOUCH DEVICE AND METHOD OF DRIVING TOUCH DEVICE

CROSS-REFERENCE TO RELATED APPLICATION

This application claims the priority benefit of Taiwan application serial no. 107120240, filed on Jun. 12, 2018. The entirety of the above-mentioned patent application is hereby incorporated by reference herein and made a part of this specification.

BACKGROUND OF THE INVENTION

1. Field of the Invention

The invention relates to a touch device and a method of driving the touch device, and particularly relates to a self-capacitive touch device and a method of driving the self-capacitive touch device.

2. Description of Related Art

In the information era nowadays, people more and more heavily rely on electronic products. To meet current demands of being more convenient, more compact in size, and more user-friendly, touch devices have been introduced as input devices of many information technology (IT) products in replacement of conventional keyboards or mice. Among the touch devices, touch display panels capable of performing both a touch function and a display function are one of the most popular products at present.

Based on different sensing types, touch devices can be generally categorized into resistive touch devices, capacitive touch devices, optical touch devices, acoustic wave touch devices, and electromagnetic touch devices. Since the capacitive touch devices are characterized as having a short response time, favorable reliability, satisfactory durability, and so on, they have been broadly used in electronic products. According to the design frameworks of touch devices, the capacitive touch devices can be roughly further categorized into mutual capacitive touch devices and self-capacitive touch devices.

While the conventional self-capacitive touch devices have the advantage of being structurally simple, issues such as having a decrease in sensing accuracy in a region with an insufficient sensing area, which results from the higher and higher demand on the resolution of display panels, or being difficult to achieve hover touch may arise when the conventional self-capacitive touch devices are integrated into in-cell touch display panels.

SUMMARY OF THE INVENTION

An embodiment of the invention provides a touch device capable of avoiding a decrease in touch sensing accuracy when the touch device is applied to a display panel having a high resolution.

An embodiment of the invention provides a touch device having a favorable hover touch capability.

An embodiment of the invention provides a method of driving a touch device, and the method is capable of executing a hover touch mode.

A touch device according to an embodiment of the invention includes a first touch electrode, a plurality of second touch electrodes, a first main connecting pad, at least one first sub-connecting pad, and a plurality of second connecting pads. Then area of the first touch electrode is smaller than the area of each of the second touch electrodes. The first main connecting pad is electrically connected to the first touch electrode. The at least one first sub-connecting pad is electrically connected to the first touch electrode. The second connecting pads are respectively electrically connected to the second connecting pads.

A touch device according to an embodiment of the invention includes a plurality of first touch electrodes, a plurality of first connecting pads, a plurality of second touch electrodes, and a plurality of second connecting pads. The first touch electrodes are respectively electrically connected to a plurality of auxiliary connecting pads through a plurality of auxiliary switch elements. The auxiliary connecting pads are electrically connected to each other. The first connecting pads are respectively electrically connected to the first touch electrodes via a plurality of first connecting lines. The second touch electrodes are respectively electrically connected to the second connecting pads via a plurality of second connecting lines.

A touch device according to an embodiment of the invention includes a plurality of first touch electrodes, a plurality of auxiliary switch elements, an interconnecting line, a plurality of first connecting pads, a plurality of second touch electrodes, and a plurality of second connecting pads. The auxiliary switch elements are respectively electrically connected to the first touch electrodes. The interconnecting line electrically connects first ends of the auxiliary switch elements to each other. The first connecting pads are respectively electrically connected to the first touch electrodes. Two of the first connecting pads are electrically connected through two of the first touch electrodes and two of the auxiliary switch elements. The second touch electrodes are respectively electrically connected to the second connecting pads.

A method of driving a touch device according to an embodiment of the invention includes the following. The touch device mentioned above is provided. A hover touch mode is executed. In the hover touch mode, the auxiliary switch elements are enabled to electrically connect the first touch electrodes to each other.

Based on the above, in the touch device according to the embodiments of the invention, with the area of the first touch electrode being smaller than the area of each of the second touch electrodes and the first touch electrode being simultaneously electrically connected to the first main connecting pad and the first sub-connecting pad, the touch device is able to avoid a decrease in touch sensing accuracy even if the first touch electrode has a smaller area and/or the touch device is applied to an in-cell touch display panel having a high resolution. Moreover, in the touch device according to the embodiments, with the first touch electrodes being respectively electrically connected to the auxiliary connecting pads through the auxiliary switch elements and the auxiliary connecting pads being electrically connected to each other, the touch device is capable of hover touch and has a favorable hover touch capability.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
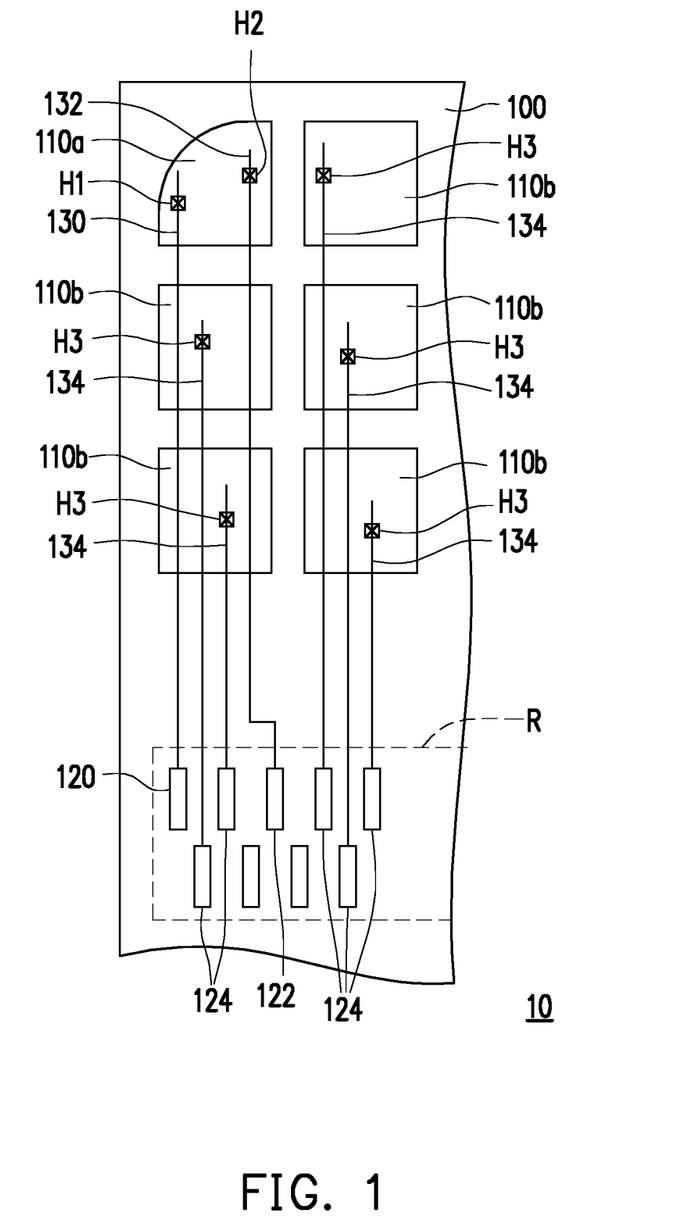
FIG. 1 is a schematic top view illustrating a touch device according to an embodiment of the invention.
Figure 2:
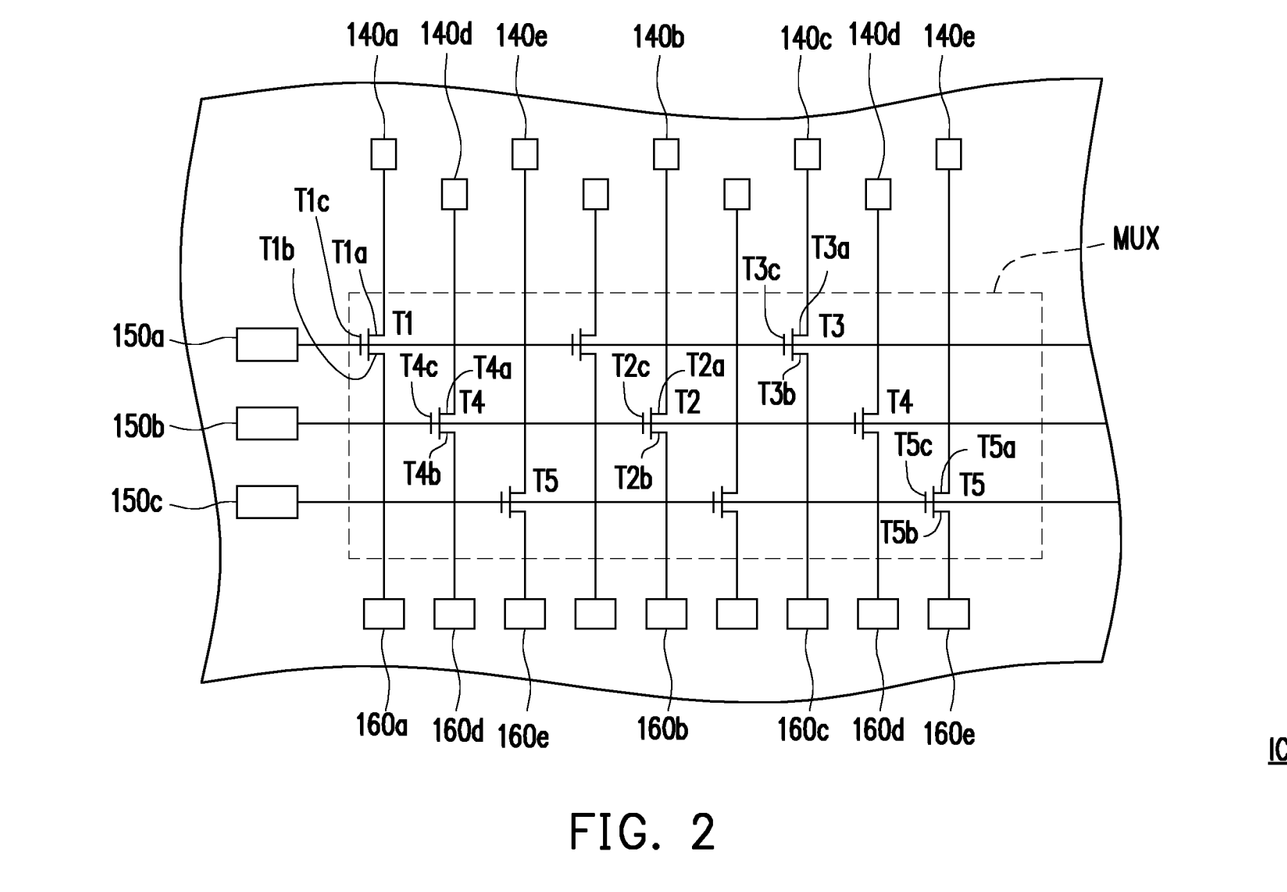
FIG. 2 is a schematic top view illustrating a driving circuit member included in the touch device of FIG. 1.

FIG. 1 is a schematic top view illustrating a touch device according to an embodiment of the invention. FIG. 2 is a schematic top view illustrating a driving circuit member included in the touch device of FIG. 1.

Referring to FIGS. 1 and 2, a touch device 10 may include a first touch electrode 110a, a plurality of second touch electrodes 110b, a first main connecting pad 120, a first sub-connecting pad 122, and a plurality of second connecting pads 124. In this embodiment, the touch device 10 may optionally further include a substrate 100, a first main connecting line 130, a first sub-connecting line 132, a plurality of second connecting lines 134, and a driving circuit member IC. For the ease of description, the driving circuit member IC is omitted in FIG. 1.

In this embodiment, the material of the substrate 100 includes, for example, glass, quartz, a plastic material, an organic polymer, metal, or other suitable materials. In an embodiment, when the touch device 10 is applied to an in-cell touch display panel, the substrate 100 may be a blank substrate in a pixel array substrate. The shape of the substrate 100 is, for example, a rectangular shape, a circular shape, other polygonal shapes, or a special shape.

In this embodiment, the first touch electrode 110a and the second touch electrodes 110b are disposed on the substrate 100. In this embodiment, the area of the first touch electrode 110a is smaller than the area of each of the second touch electrodes 110b. As shown in FIG. 1, the first touch electrode 110a is in an irregular shape (or special shape), and the second touch electrode 110b is in a rectangular shape. However, the invention is not limited thereto. The shapes of the first touch electrode 110a and the second touch electrode 110b may be adjusted according to the framework, needs, etc. of the actual touch device 10. For example, the touch device 10 may be a specially-shaped touch device, as long as the area of the first touch electrode 110a is smaller than the area of each of the second touch electrodes 110b. Besides, as shown in FIG. 1, the first touch electrode 110a is disposed at the corner of the substrate 100. However, the invention is not limited thereto. The arrangement of the first touch electrode 110a and the second touch electrodes 110b may be adjusted according to the framework, needs, etc. of the actual touch device 10, as long as the area of the first touch electrode 110a is smaller than the area of each of the second touch electrodes 110b.

In this embodiment, the materials of the first touch electrode 110a and the second touch electrodes 110b include, for example, metal oxide, such as (but not limited to) indium tin oxide, indium zinc oxide, aluminum tin oxide, aluminum zinc oxide, indium gallium zinc oxide, other suitable oxide, or a stacked layer of at least two of the aforementioned materials.

In this embodiment, the first main connecting pad 120, the first sub-connecting pad 122, and the second connecting pads 124 are disposed on the substrate 100. As shown in FIG. 1, the first main connecting pad 120, the first sub-connecting pad 122, and the second connecting pads 124 are disposed in a driving circuit member bonding area R for bonding the driving circuit member IC (details in this regard will be described in the subsequent paragraphs). In this embodiment, the materials of the first main connecting pad 120, the first sub-connecting pad 122, and the second connecting pads 124 include (but not limited to) metal, alloy, metal nitride, metal oxide, metal oxynitride, a transparent conductive material, other non-metal materials with a conductive property, or other suitable materials.

In this embodiment, the first main connecting line 130, the first sub-connecting line 132, and the second connecting lines 134 are disposed on the substrate 100. In this embodiment, the first main connecting line 130 electrically connects the first touch electrode 110a and the first main connecting pad 120, the first sub-connecting line 132 electrically connects the first touch electrode 110a and the first sub-connecting pad 122, and each of the second connecting lines 134 respectively electrically connects the corresponding second touch electrode 110b and the corresponding second connecting pad 124. In other words, In this embodiment, the first main connecting pad 120 is electrically connected to the first touch electrode 110a via the first main connecting line 130, the first sub-connecting pad 122 is electrically connected to the first touch electrode 110a via the first sub-connecting line 132, and each of the second connecting pads 124 is electrically connected to one of the second touch electrodes 110b via one of the second connecting lines 134. From another perspective, in this embodiment, the first main connecting pad 120 and the first sub-connecting pad 122 are electrically connected to the same first touch electrode 110a, and any one of the second connecting pads 124 is electrically connected to one of the second touch electrodes 110b in a one-to-one relationship.

In this embodiment, the materials of the first main connecting line 130, the first sub-connecting line 132, and the second connecting lines 134 include (but not limited to) metal, alloy, metal nitride, metal oxide, metal oxynitride, a transparent conductive material, other non-metal materials with a conductive property, or other suitable materials. In an embodiment, the first main connecting line 130, the first sub-connecting line 132, and the second connecting lines 134 may belong to the same patterned layer as the layer to which the first main connecting pad 120, the first sub-connecting pad 122, and the second connecting pads 124 belong. In another embodiment, the first main connecting line 130, the first sub-connecting line 132, and the second connecting lines 134 may belong to the same patterned layer, but this layer is different from the patterned layer to which the first main connecting pad 120, the first sub-connecting pad 122, and the second connecting pads 124 belong.

Besides, in this embodiment, the first main connecting line 130 is electrically connected to the first touch electrode 110*a* via a contact hole H1, the first sub-connecting line 132 is electrically connected to the first touch electrode 110*a* via a contact hole H2, and each of the second connecting lines 134 is electrically connected to the corresponding second touch electrode 110*b* via a contact hole H3. The first main connecting line 130 and the first sub-connecting line 132 are electrically connected with each other via the contact hole H1, the first touch electrode 110*a* and the contact hole H2.

In this embodiment, as shown in FIG. 2, the driving circuit member IC includes a multiplexer MUX, but the invention is not limited thereto. In other embodiments, the multiplexer MUX may be not disposed within the driving circuit member IC. In this embodiment, the driving circuit member IC may optionally include a plurality of third connecting pads 140*a* to 140*e*, a plurality of controllers 150*a* to 150*c*, and a plurality of detectors 160*a* to 160*e*.

In this embodiment, the multiplexer MUX may include a main switch element T1, a sub-switch element T2, a first switch element T3, a plurality of second switch elements T4, and a plurality of third switch elements T5. As shown in FIG. 2, the main switch element T1 includes a first end T1*a*, a second end T1*b*, and a control end T1*c*, the sub-switch element T2 includes a first end T2*a*, a second end T2*b*, and a control end T2*c*, the first switch element T3 includes a first end T3*a*, a second end T3*b*, and a control end T3*c*, each of the second switch elements T4 includes a first end T4*a*, a second end T4*b*, and a control end T4*c*, and each of the third switch elements T5 includes a first end T5*a*, a second end T5*b*, and a control end T5*c*. In this embodiment, the main switch element T1, the sub-switch element T2, the first switch element T3, the second switch elements T4, and the third switch elements T5 may be any kind of bottom gate thin film transistors, top gate thin film transistors, or other suitable thin film transistors well-known by people having ordinary skill in the art.

In this embodiment, the first end T1*a* of the main switch element T1 is electrically connected to the third connecting pad 140*a*, the first end T2*a* of the sub-switch element T2 is electrically connected to the third connecting pad 140*b*, the first end T3*a* of the first switch element T3 is electrically connected to the third connecting pad 140*c*, and the first end T4*a* of each of the second switch elements T4 is electrically connected to the corresponding third connecting pad 140*d*, and the first end T5*a* of each of the third switch elements T5 is electrically connected to the corresponding third connecting pad 140*e*. In other words, in this embodiment, any one of the main switch element T1, the sub-switch element T2, the first switch element T3, the second switch elements T4, and the third switch elements T5 is electrically connected to corresponding one of the third connecting pads 140*a* to 140*e* in a one-to-one relationship.

Referring to FIGS. 1 and 2, in this embodiment, the third connecting pad 140*a* is bonded to the first main connecting pad 120, the third connecting pad 140*b* is bonded to the first sub-connecting pad 122, each of the third connecting pads 140*c* to 140*e* is bonded to the corresponding second connecting pad 124. In other words, in the touch device 10, the driving circuit member IC is disposed in the driving circuit member bonding region R through bonding the third connecting pads 140*a* to 140*e* to the first main connecting pad 120, the first sub-connecting pad 122, and the second connecting pads 124 in a one-to-one relationship. Besides, any bonding process well-known by people having ordinary skill in the art, such as a soldering bonding process, a thermal compression bonding process, or an anisotropic conductive paste bonding process, may be adopted to bond the third connecting pad 140*a* to the first main connecting pad 120, bond the third connecting pad 140*b* to the first sub-connecting pad 122, bond each of the third connecting pads 140*c* to 140*e* to the corresponding second connecting pad 124.

In this embodiment, the controllers 150*a* to 150*c* may sequentially provide a start signal for enabling to the corresponding switch elements according to timings, so as to enable the switch elements. As shown in FIG. 2, in this embodiment, the control end T1*c* of the main switch element T1 is electrically connected to the controller 150*a*, the control end T2*c* of the sub-switch element T2 is electrically connected to the controller 150*b*, the control end T3*c* of the first switch element T3 is electrically connected to the controller 150*a*, the control end T4*c* of each of the second switch elements T4 is electrically connected to the corresponding controller 150*b*, and the control end T5*c* of each of the third switch elements T5 is electrically connected to the corresponding controller 150*c*. In this embodiment, at the timing when the controller 150*a* provides the start signal for enabling, the main switch element T1 and the first switch element T3 are turned on. In other words, the first end T1*a* of the main switch element T1 and the second end T1*b* of the main switch element T1 are conductive with each other, and the first end T1*a* of the first switch element T3 and the second end T3*b* of the first switch element T3 are conductive with each other. At the timing when the controller 150*b* provides the start signal for enabling, the sub-switch element T2 and each of the second switch elements T4 are turned on. In other words, the first end T4*a* and the second end T4*b* of each of the second switch elements T4 are conductive with each other, and the first end T2*a* and the second end T2*b* of the sub-switch element T2 are conductive with each other. At the timing when the controller 150*c* provides the start signal for enabling, each, of the third switch elements T5 is turned on. In other words, the first end T5*a* and the second end T5*b* of each of the third switch elements T5 are conductive with each other. From another perspective, in this embodiment, the control end T1*c* of the main switch element T1 and the control end T2*c* of the sub-switch element T2 are electrically connected to different controllers (i.e., the controller 150*a* and the controller 150*b*). Therefore, the control end T1*c* of the main switch element T1 and the control end T2*c* of the sub-switch element T2 are not electrically connected.

In this embodiment, the detectors 160*a* to 160*e* serve to receive and process touch capacitive signals provided by the corresponding connecting pads, so as to obtain touch information. As shown in FIG. 2, in this embodiment, the second end T1*b* of the main switch element T1 is electrically connected to the detector 160*a*, the second end T2*b* of the sub-switch element T2 is electrically connected to the detector 160*b*, the second end T3*b* of the first switch element T3 is electrically connected to the detector 160*c*, the second end T4*b* of each of the second switch elements T4 is electrically connected to the corresponding detector 160*d*, and the second end T5*b* of each of the third switch elements T5 is electrically connected to the corresponding detector 160*e*. In this way, in a state where the main switch element T1 and the first switch element T3 are turned on, the detector 160*a* and the detector 160*c* respectively receive and process the touch capacitive signals transmitted from the third connecting pad 140*a* and the third connecting pad 140*c*; in a state where the sub-switch element T2 and each of the second switch elements T4 are turned on, the detector 160b and each detector 160d respectively receive and process the touch capacitive signals transmitted from the third connecting pad 140b and each third connecting pad 140d, and in a state where each of the second switch elements T4 is turned on, each detector 160e respectively receives and processes the touch capacitive signal from each third connection pad 140e.

As described above, in this embodiment, with the first main connecting pad 120 and the third connecting pad 140a being electrically connected to the first touch electrode 110a, the first sub-connecting pad 122 and the third connecting pad 140b being electrically connected to the first touch electrode 110a, and each of the second connecting pads 124 and the corresponding one of the third connecting pads 140c to 140e being electrically connected to the second touch electrode 110b, the touch capacitive signals of the first touch electrode 110a can be respectively received and processed by the detectors 160a and 160b at different timings. In other words, in this embodiment, the touch capacitive signals of the first touch electrode 110a which is electrically connected to both of the first main connecting pad 120 and the first sub-connecting pad 122 are detected for a greater number of times than that of the second touch electrode 110b.

Figure 3:
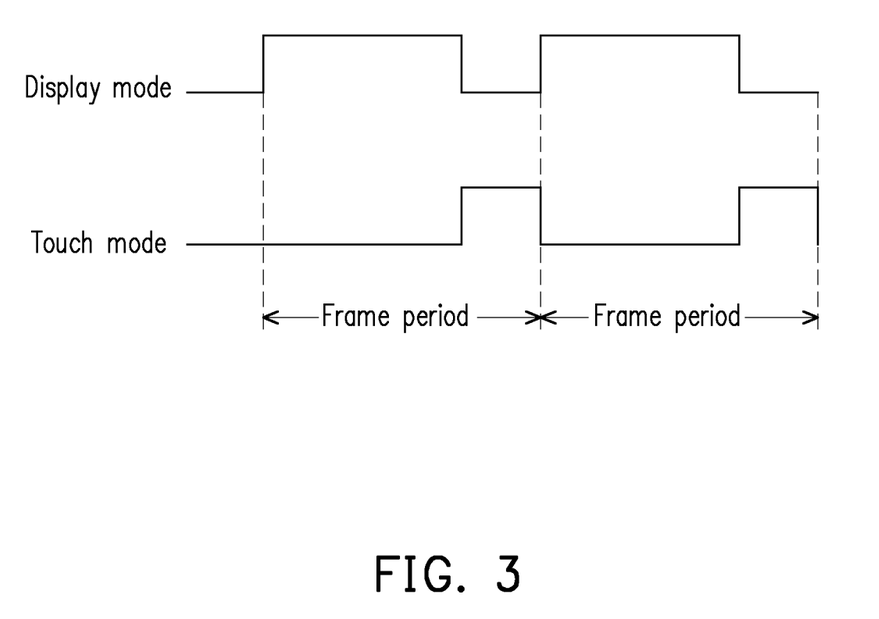
FIG. 3 is a schematic diagram illustrating a driving waveform when the touch device of FIG. 1 is applied to an in-cell touch display panel.

In general, in an in-cell touch display panel, a display mode and a touch mode are driven in a time-dividing manner under each frame period. Based on the above, referring to FIG. 3, when the touch device 10 is applied to an in-cell touch display panel, the first touch electrode 110a having a smaller area than the area of the second touch electrode 110b is both electrically connected to the first main connecting pad 120 and the first sub-connecting pad 122, such that even though the first touch electrode 110a has a smaller area, the touch device 10 is still able to avoid a decrease in touch sensing accuracy. This is because the number of times that the touch capacitive signals of the first touch electrode 110a are detected is greater than the number of times that the touch capacitive signals of the second touch electrode 110b having a larger area are detected. Besides, since the touch capacitive signals of the first touch electrode are detected for a greater number of times, the touch device 10 is still able to avoid a decrease in touch sensing accuracy even when the touch device 10 is applied to an in-cell touch display panel having a high resolution, where the time allocated for the touch mode is shorter within a single frame period.

Besides, in this embodiment, the touch device 10 includes only one first sub-connecting line 132 and one first sub-connecting pad 122. However, the invention is not limited thereto. In other embodiments, those utilizing the invention may adjust the numbers of the first sub-connecting line 132 and the first sub-connecting pad 122 according to the design needs, and may correspondingly adjust the number of the respective components of the driving circuit member IC, so as to increase the number of detected times of the touch capacitive signals of the first touch electrode 110a.

Besides, in this embodiment, the touch device 10 includes three controllers 150a to 150c. However, the invention is not limited thereto. In other embodiments, those utilizing the invention may adjust the number of the controllers according to the design requirement.

Besides, in this embodiment, the first sub-connecting line 132 is electrically connected to the first touch electrode 110a via the contact hole H2. However, the invention is not limited thereto. In other embodiments, the first sub-connecting line 132 may also be electrically connected to the first touch electrode 110a without going through the contact hole H2. In the following, other variations are described in detail with reference to FIGS. 4 and 5. It should be noted that the reference numerals and a part of the contents in the previous embodiment are used in the following embodiments. Also, identical or similar reference numerals indicate identical or similar components, and repeated description of the same technical contents is omitted. For a detailed description of the omitted parts, reference can be found in the previous embodiment and these parts will not be further reiterated in the following.

Figure 4:
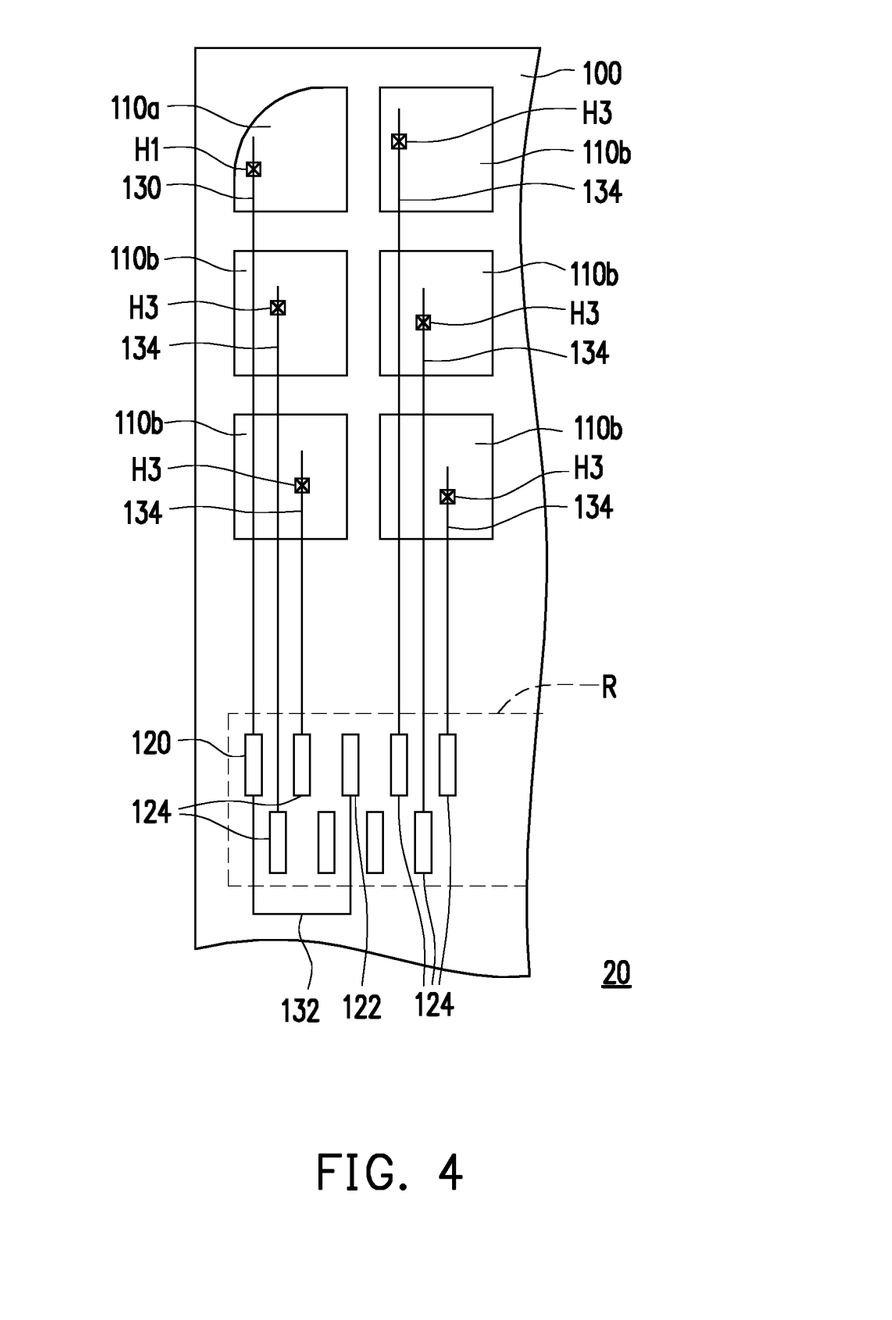
FIG. 4 is a schematic top view illustrating a touch device according to another embodiment of the invention.

FIG. 4 is a schematic top view illustrating a touch device according to another embodiment of the invention. Referring to FIGS. 4 and 1, a touch device 20 of FIG. 4 is similar to the touch device 10 of FIG. 1. Therefore, identical or similar components are indicated by identical or similar reference numerals, and repeated description of the same technical contents is omitted. For a detailed description of the omitted parts, reference can be found in the previous embodiment. It should be noted that, while the driving circuit member IC is omitted in FIG. 4, people having ordinary skill in the art shall understand that the touch device 20 of FIG. 4 includes the driving circuit member IC according to the description of the embodiment shown in FIGS. 1 and 2. The difference between the embodiments will be described in the following.

Referring to FIG. 4, in this embodiment, the first sub-connecting line 132 is electrically connected between the first main connecting pad 120 and the first sub-connecting pad 122. In other words, in this embodiment, the first sub-connecting line 132 is electrically connected to the first touch electrode 110a through the first main connecting pad 120, the first main connecting line 130, and the contact hole H1. From another perspective, in this embodiment, the first main connecting pad 120 and the first sub-connecting pad 122 are both able to receive the touch capacitive signals of the first touch electrode 110a. In other words, the first touch electrode 110a is electrically connected to both of the first main connecting pad 120 and the first sub-connecting pad 122. Besides, in this embodiment, the first main connecting pad 120 and the first sub-connecting line 132 are substantially electrically connected between the first sub-connecting pad 122 and the first touch electrode 110a, and the first main connecting pad 120 and the first sub-connecting pad 122 are substantially located between the first sub-connecting line 132 and the first touch electrode 110a.

Figure 5:
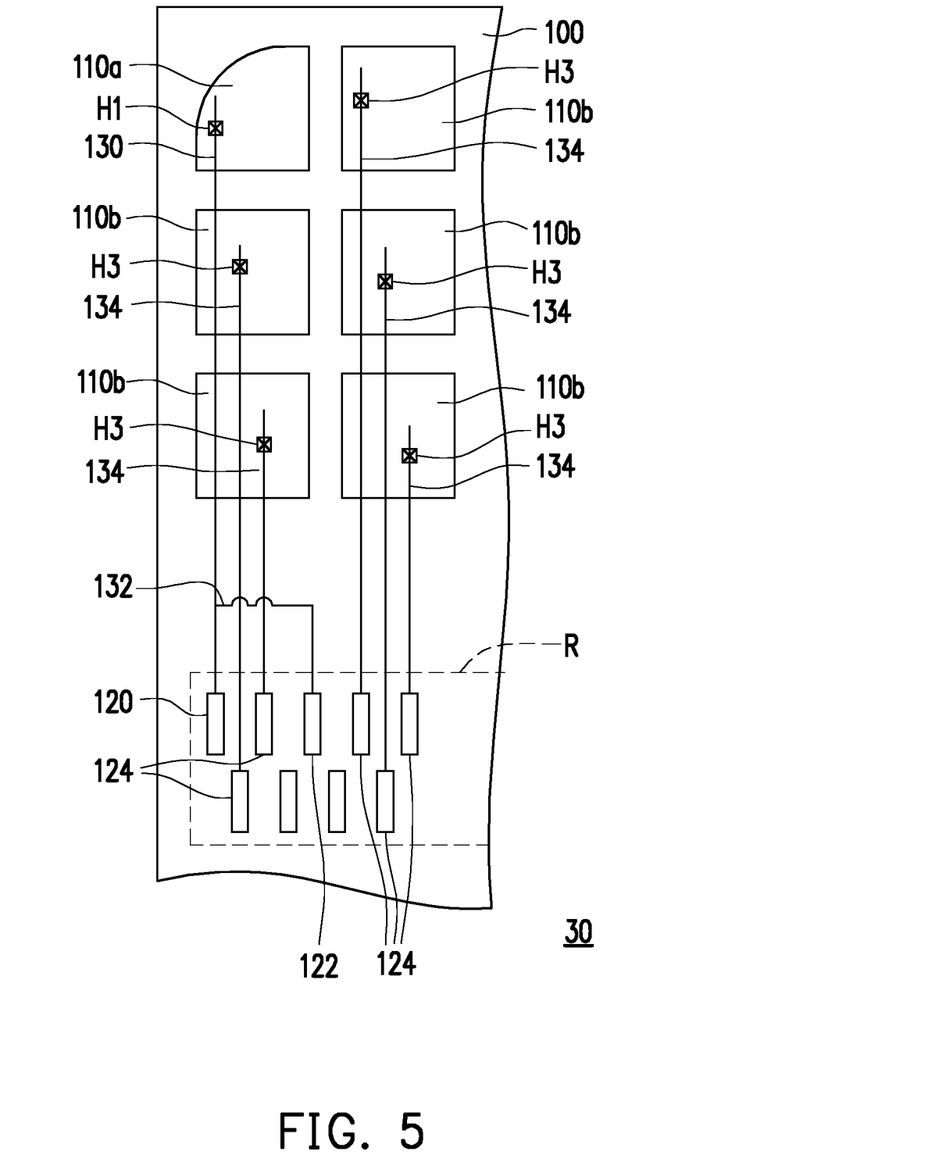
FIG. 5 is a schematic top view illustrating a touch device according to another embodiment of the invention.

FIG. 5 is a schematic top view illustrating a touch device according to another embodiment of the invention. Referring to FIGS. 5 and 1, a touch device 30 of FIG. 5 is similar to the touch device 10 of FIG. 1. Therefore, identical or similar components are indicated by identical or similar reference numerals, and repeated description of the same technical contents is omitted. For a detailed description of the omitted parts, reference can be found in the previous embodiment. It should be noted that, while the driving circuit member IC is omitted in FIG. 5, people having ordinary skill in the art shall understand that the touch device 30 of FIG. 5 includes the driving circuit member IC according to the description of the embodiment shown in FIGS. 1 and 2. The difference between the embodiments will be described in the following.

Referring to FIG. 5, in this embodiment, the first sub-connecting line 132 is electrically connected between the first main connecting line 130 and the first sub-connecting pad 122. In other words, in this embodiment, the first sub-connecting line 132 is electrically connected to the first touch electrode 110a through the first main connecting line 130 and the contact hole H1, the first sub-connecting line 132 and the second connecting lines 314 are, for example, formed in different layers, and the first sub-connecting line 132 intersects at least one of the second connecting line 134, for example. In this embodiment, the first main connecting line 130 is electrically connected to the first main connecting pad 120. Therefore, the first sub-connecting line 132 is also electrically connected between the first main connecting pad 120 and the first sub-connecting pad 122, and the first main connecting pad 120 and the first sub-connecting pad 122 are both able to receive the touch capacitive signals of the first touch electrode 110a. In other words, the first touch electrode 110a is simultaneously electrically connected to the first main connecting pad 120 and the first sub-connecting pad 122.

In this embodiment, the first sub-connecting line 132 is substantially located between the first sub-connecting pad 122 and the first touch electrode 110a. In addition, in this embodiment, the first sub-connecting line 132 and the first main connecting line 130 may belong to different layers and not at the same horizontal level.

Figure 6:
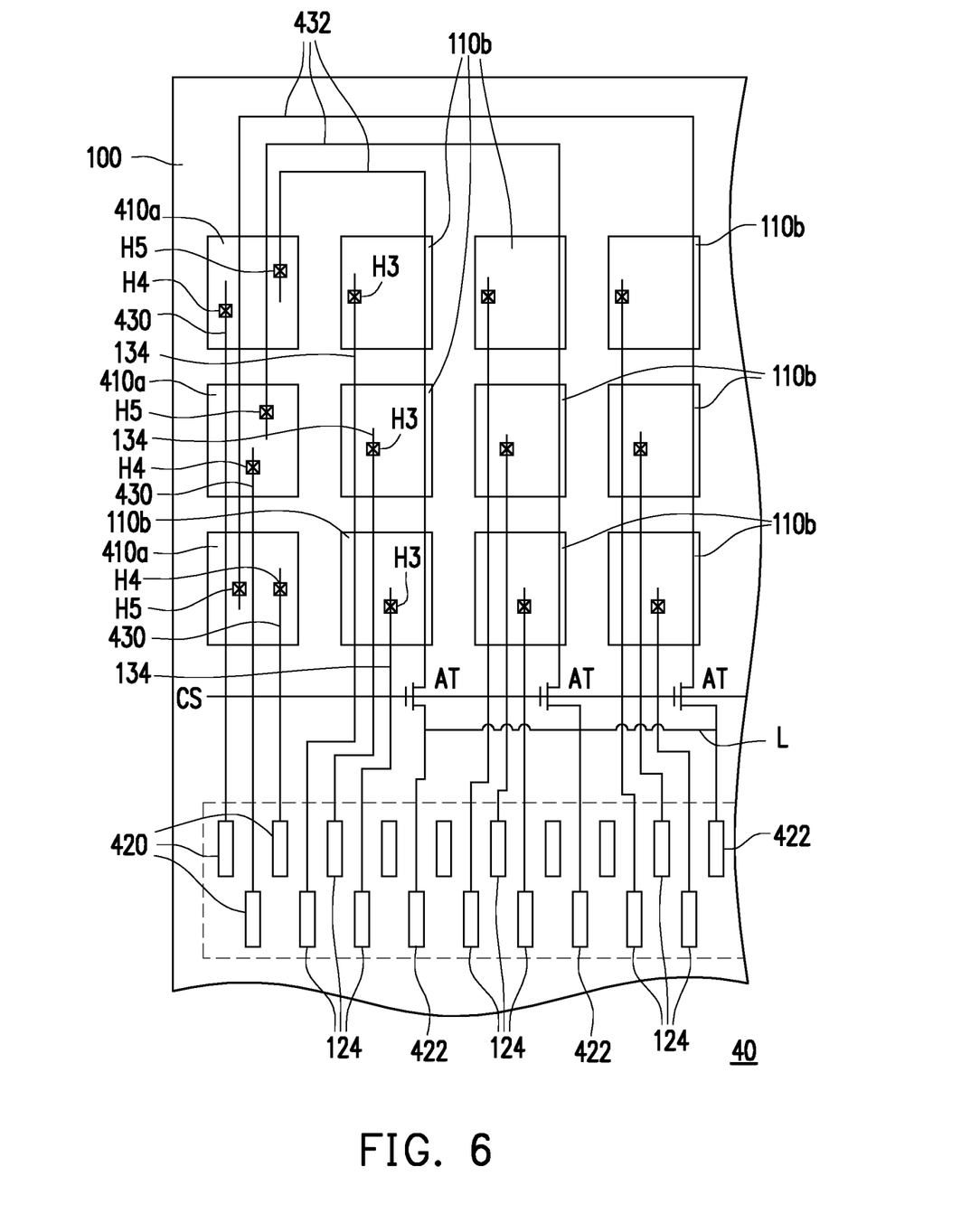
FIG. 6 is a schematic top view illustrating a touch device according to another embodiment of the invention.
Figure 7:
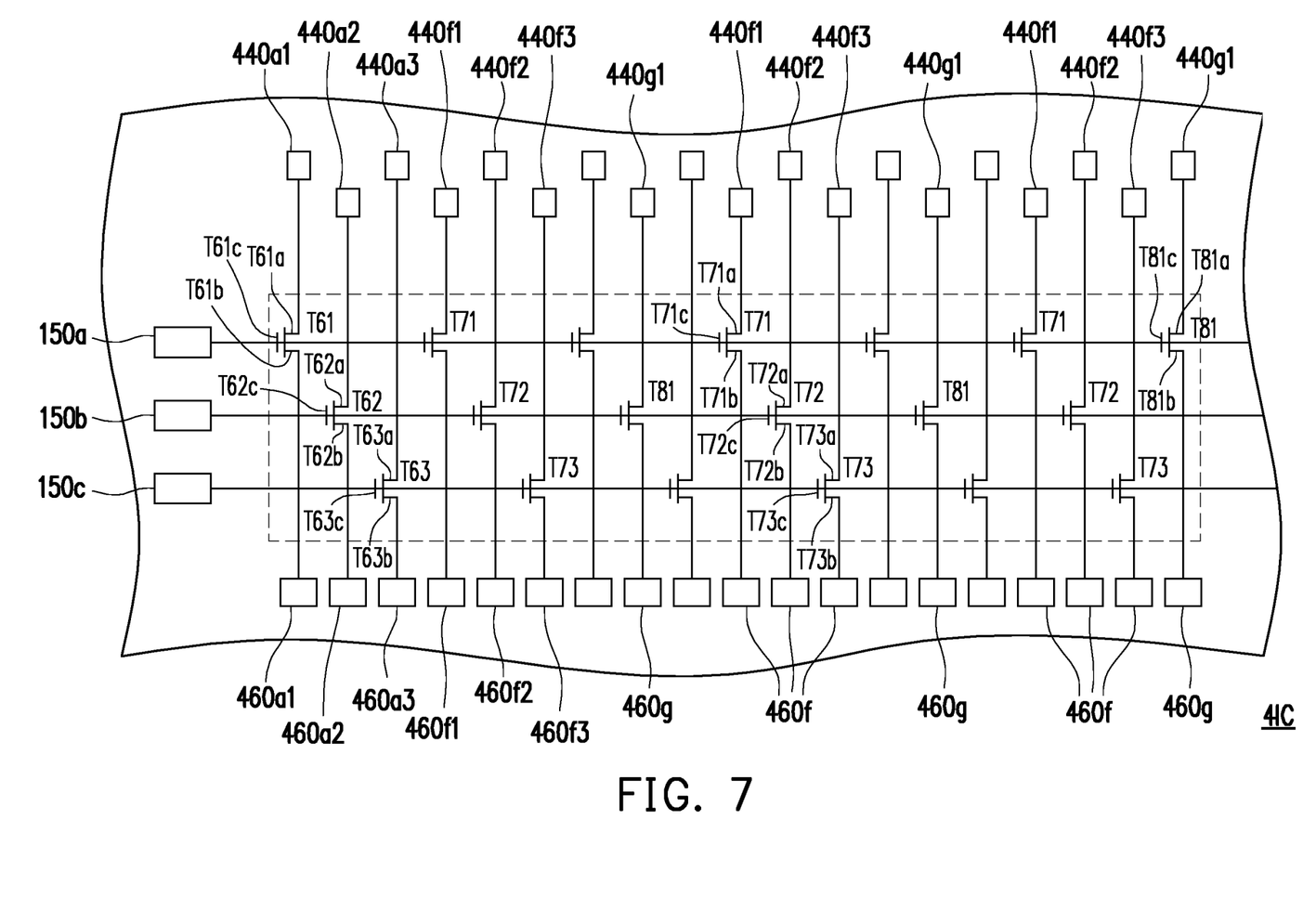
FIG. 7 is a schematic top view illustrating a driving circuit member included in the touch device of FIG. 6.

FIG. 6 is a schematic top view illustrating a touch device according to another embodiment of the invention. FIG. 7 is a schematic top view illustrating a driving circuit member included in the touch device of FIG. 6. Referring to FIGS. 6 and 1, a touch device 40 of FIG. 6 is similar to the touch device 10 of FIG. 1. Therefore, identical or similar components are indicated by identical or similar reference numerals, and repeated description of the same technical contents is omitted. For a detailed description of the omitted parts, reference can be found in the previous embodiment. The difference between the embodiments will be described in the following.

Referring to FIGS. 6 and 7, in this embodiment, the touch device 40 may include a plurality of first touch electrodes 410a disposed on the substrate 100. As shown in FIG. 6, the first touch electrode 410a and the second touch electrode 110b have the same rectangular shape. However, the invention is not limited thereto. The shapes of the first touch electrode 410a and the second touch electrode 110b may be adjusted according to the framework, needs, etc. of the actual touch device 40 (e.g., an irregular (or specially-shaped) touch device). As shown in FIG. 6, the first touch electrodes 410a are arranged in the same column. However, the invention is not limited thereto. In this embodiment, the material of the first touch electrode 410a includes, for example, metal oxide, such as (but not limited to) indium tin oxide, indium zinc oxide, aluminum tin oxide, aluminum zinc oxide, indium gallium zinc oxide, other suitable oxide, or a stacked layer of at least two of the aforementioned materials.

In this embodiment, the touch device 40 may include a plurality of first connecting pads 420 and a plurality of auxiliary connecting pads 422 disposed on the substrate 100. As shown in FIG. 6, the first connecting pads 420, the auxiliary connecting pads 422, and the second connecting pads 124 are disposed in the driving circuit member bonding area R for bonding a driving circuit member 4IC (details in this regard will be described in the subsequent paragraphs). It should be noted that, for the ease of description, the driving circuit member 4IC is omitted in FIG. 6. In this embodiment, the materials of the first connecting pads 420 and the auxiliary connecting pads 422 include (but not limited to) metal, alloy, metal nitride, metal oxide, metal oxynitride, a transparent conductive material, other non-metal materials with a conductive property, or other suitable materials.

In this embodiment, the touch device 40 may include a plurality of first connecting lines 430, a plurality of auxiliary connecting lines 432, and an interconnecting line L. In this embodiment, each of the first connecting lines 430 electrically connects the corresponding first touch electrode 410a and the corresponding first connecting pad 420. In other words, in this embodiment, each of the first connecting pads 420 is electrically connected to one of the first touch electrodes 410a via one of the first connecting lines 430. From another perspective, in this embodiment, any one of the first connecting pads 420 is electrically connected to one of the touch electrodes 410a in a one-to-one relationship.

In this embodiment, the auxiliary connecting lines 432 are respectively electrically connected to a plurality of auxiliary switch elements AT. As shown in FIG. 6, the auxiliary switch elements AT are located between the auxiliary connecting pads 422 and the first touch electrodes 410a. In this way, when the auxiliary switch elements AT are enabled and turned on by receiving a control signal CS from the driving circuit member 4IC (details will be described in subsequent paragraphs), each of the auxiliary connecting lines 432 respectively electrically connects the corresponding first touch electrode 410a and the corresponding auxiliary connecting pad 422. Comparatively, when the auxiliary switch elements AT are disabled and are in an off state because of not receiving the control signal CS, the first touch electrodes 410 are not electrically connected to the corresponding auxiliary connecting pads 422. In other words, in this embodiment, each of the auxiliary connecting pads 422 is electrically connected to one of the first touch electrodes 410a via one of the auxiliary connecting lines 432. From another perspective, in this embodiment, each of the first touch electrodes 410a is simultaneously electrically connected to the first connecting pad 420 and the auxiliary connecting pad 422.

Furthermore, in this embodiment, the interconnecting line L connects the auxiliary connecting lines 432 in series. As shown in FIG. 6, the auxiliary switch elements AT are located between the interconnecting line L and the first touch electrodes 410a. In this way, when the auxiliary switch elements AT receive the control signal CS and are turned on, the first touch electrodes 410a are electrically connected to each other, the auxiliary connecting lines 432 are electrically connected to each other, and the auxiliary connecting pads 422 are electrically connected to each other, as the interconnecting line L connects the auxiliary connecting lines 432 in series. Alternatively, when the auxiliary switch elements AT do not receive the control signal CS and are in the off state, the first touch electrodes 410a are not electrically connected to each other, the auxiliary connecting lines 432 are not electrically connected to each other, and the auxiliary connecting pads 422 are not electrically connected to each other.

In this embodiment, the materials of the first connecting lines 430, the auxiliary connecting lines 432, and the interconnecting line L include (but not limited to) metal, alloy, metal nitride, metal oxide, metal oxynitride, a transparent conductive material, other non-metal materials with a conductive property, or other suitable materials. In an embodiment, the interconnecting line L may belong to a layer different from the patterned layer to which the first connecting lines 430, the auxiliary connecting lines 432, and the second connecting lines 134 belong. In an embodiment, the first connecting lines 430 and the auxiliary connecting lines 432 may belong to the same patterned layer as the layer to which the first connecting pads 420 and the auxiliary connecting pads 422 belong. In another embodiment, the first connecting lines 430 and the auxiliary connecting lines 432 may belong to a patterned layer different from another patterned layer to which the first connecting pads 420 and the auxiliary connecting pads 422 belong.

Besides, in this embodiment, each of the first connecting lines 430 is electrically connected to the corresponding first touch electrode 410a via a contact hole H4, and each of the auxiliary connecting lines 432 is electrically connected to the corresponding first touch electrode 410a via a contact hole H5.

In this embodiment, the multiplexer MUX of the driving circuit member 4IC may include a first switch element T61, a first switch element T62, a first switch element T63, a plurality of second switch elements T71, a plurality of second switch elements T72, a plurality of second switch elements T73, and a plurality of third switch elements T81. As shown in FIG. 7, the first switch element T61 includes a first end T61a, a second end T61b, and a control end T61c, the first switch element T62 includes a first end T62a, a second end T62b, and a control end T62c, the first switch element T63 includes a first end T63a, a second end T63b, and a control end T63c, each of the second switch elements T71 includes a first end T71a, a second end T71b, and a control end T71c, each of the second switch elements T72 includes a first end T72a, a second end T72b, and a control end T72c, each of the second switch elements T73 includes a first end T73a, a second end T73b, and a control end T73c, and each of the third switch elements T81 includes a first end T81a, a second end T81b, and a control end T81c. In this embodiment, the first switch element T61, the first switch element T62, the first switch element T63, the second switch elements T71, the second switch elements T72, the second switch elements T73, and the third switch elements T81 may be any kind of bottom gate thin film transistors, top gate thin film transistors, or other suitable thin film transistors well-known by people having ordinary skill in the art.

In this embodiment, the driving circuit member 4IC may include a third connecting pad 440a1, a third connecting pad 440a2, a third connecting pad 440a3, a plurality of third connecting pads 440f1, a plurality of third connecting pads 440f2, a plurality of third connecting pads 440f3, and a plurality of third connecting pads 440g1. In this embodiment, the first end T61a of the first switch element T61 is electrically connected to the third connecting pad 440a1, the first end T62a of the first switch element T62 is electrically connected to the third connecting pad 440a2, the first end T63a of the first switch element T63 is electrically connected to the third connecting pad 440a3, the first end T71a of each of the second switch elements T71 is electrically connected to the corresponding third connecting pad 440f1, the first end T72a of each of the second switch elements T72 is electrically connected to the corresponding third connecting pad 440f2, the first end T73a of each of the second switch elements T73 is electrically connected to the corresponding third connecting pad 440f3, and the first end T81a of each of the third switch elements T81 is electrically connected to the corresponding third connecting pad 440g1. In other words, in this embodiment, any one of the first switch element T61, the first switch element T62, the first switch element T63, the second switch elements T71, the second switch elements T72, the second switch elements T73, and the third switch elements T81 is electrically connected to corresponding one of the third connecting pad 440a1, the third connecting pad 440a2, the third connecting pad 440a3, the third connecting pads 440f1, the third connecting pads 440f2, the third connecting pads 440f3, and the third connecting pads 440g1 in a one-to-one relationship.

In this embodiment, referring to FIGS. 6 and 7, each of the third connecting pads 440a1 to 440a3 is bonded to the corresponding first connecting pad 420, each of the third connecting pads 440f1 to 440f3 is bonded to the corresponding second connecting pad 124, and each of the third connecting pads 440g1 is bonded to the corresponding auxiliary connecting pad 422. In other words, in the touch device 40, the driving circuit member 4IC is disposed in the driving circuit member bonding region R through bonding the third connecting pads 440a1 to 440a3, the third connecting pads 440f1 to 440f3, and the third connecting pads 440g1 to the first connecting pads 420, the second connecting pads 124, and the auxiliary connecting pads 422 in a one-to-one relationship. Besides, any bonding process well-known by people having ordinary skill in the art, such as a soldering bonding process, a thermal compression bonding process, or an anisotropic conductive paste bonding process, may be adopted to bond each of the third connecting pads 440a1 to 440a3 to the corresponding first connecting pad 420, bond each of the third connecting pads 440f1 to 440f3 to the corresponding second connecting pad 124, bond each of the third connecting pads 440g1 to the corresponding auxiliary connecting pad 422.

As described previously, the controllers 150a to 150c may sequentially provide the start signal for enabling to the corresponding switch elements according to timings, so as to turn on the switch elements. As shown in FIG. 7, in this embodiment, the control end T61c of the first switch element T61 is electrically connected to the controller 150a, the control end T62c of the first switch element T62 is electrically connected to the controller 150b, the control end T63c of the first switch element T63 is electrically connected to the controller 150c, the control end T71c of each of the second switch elements T71 is electrically connected to the controller 150a, the control end T72c of each of the second switch elements T72 is electrically connected to the controller 150b, the control end T73c of each of the second switch elements T73 is electrically connected to the corresponding controller 150c, and the control ends T81c of the third switch elements T81 are respectively electrically connected to the corresponding controller 150a or 150b. In this embodiment, the first switch element T61, each of the second switch elements T71, and the rightmost third switch element T81 are turned on at the timing when the controller 150a provides the start signal for enabling. In other words, the first end T61a of the first switch element T61 and the second end T61b of the first switch element T61 are conductive with each other, the first end T71a and the second end T71b of each of the second switch elements T71 are conductive with each other, and the first end T81a of the rightmost third switch element T81 and the second end T81b of the rightmost third switch element T81 is conductive with each other. The first switch element T62, each of the second switch elements T72, and the two third switch elements T81 on the left side are turned on at the timing when the controller 150b provides the start signal for enabling. In other words, the first end T62a of the first switch element T62 and the second end T62b of the first switch element T62 are conductive with each other, the first end T72a and the second end T72b of each of the second switch elements T72 are conductive with each other, and the first end T81a and the second end T81b of each of the two third switch elements T81 on the left side are conductive with each other. The first switch element T63 and each of the second switch elements T73 are turned on at the timing when the controller 150c provides the start signal for enabling. In other words, the first end T63a of the first switch element T63 and the second end T63b of the first switch element T63 are conductive with each other, and the first end T73a and the second end T73b of each of the second switch elements T73 are conductive with each other. From another perspective, in this embodiment, the control end T61c of the first switch element T61, the control end T62c of the first switch element T62, and the control end T63c of the first switch element T63 are electrically connected to different controllers (i.e., the controller 150a, the controller 150b, and the controller 150c). Therefore, the control end T61c of the first switch element T61, the control end T62c of the first switch element T62, and the control end T63c of the first switch element T63 are not electrically connected to each other. In addition, the control end T71c of each of the second switch elements T71, the control end T72c of each of the second switch elements T72, and the control end T73c of each of the second switch elements T73 are electrically connected to different controllers (i.e., the controller 150a, the controller 150b, and the controller 150c). Therefore, the control end T71c of each of the second switch elements T71, the control end T72c of each of the second switch elements T72, and the control end T73c of each of the second switch elements T73 are not electrically connected to each other.

In this embodiment, the driving circuit member 4IC may include a detector 460a1, a detector 460a2, a detector 460a3, a plurality of detectors 460f1, a plurality of detectors 460f2, a plurality of detectors 460f3, and a plurality of detectors 460g. The detector 460a1, the detector 460a2, the detector 460a3, the detectors 460f1, the detectors 460f2, the detectors 460f3, and the detectors 460g serve to receive and process the touch capacitive signals from the corresponding connecting pads, so as to obtain the touch information. As shown in FIG. 7, in this embodiment, the second end T61b of the first switch element T61 is electrically connected to the detector 460a1, the second end T62b of the first switch element T62 is electrically connected to the detector 460a2, the second end T63b of the first switch element T63 is electrically connected to the detector 460a3, the second end T71b of each of the second switch elements T71 is electrically connected to the corresponding detector 460f1, the second end T72b of each of the second switch elements T72 is electrically connected to the corresponding detector 460f2, the second end T73b of each of the second switch elements T73 is electrically connected to the corresponding detector 460f3, and the second end T81b of the each of the third switch elements T81 is electrically connected to the corresponding detector 460g. In this way, at the timing when the first switch element T61, each of the second switch elements T71, and the rightmost third switch element T81 are turned on, the detector 460a1, each of the detectors 460f1, and the rightmost detector 460g respectively receive and process the touch capacitive signals transmitted from the third connecting pad 440a1, each of the third connecting pads 440f1, and the rightmost third connecting pad 440g1. At the timing when the first switch element T62, each of the second switch elements T72, and the two third switch elements T81 on the left side are turned on, the detector 460a2, each of the detectors 460f2, and the two detectors 460g on the left side respectively receive and process the touch capacitive signals transmitted from the third connecting pad 440a2, each of the third connecting pads 440f2, and the two third connecting pads 440g1 on the left side. At the timing when the first switch element T63 and each of the second switch elements T73 are turned on, the detector 460a3 and each of the detectors 460f3 respectively receive and process the touch capacitive signals from the third connecting pad 440a3 and each of the third connecting pads 440f3.

As described above, in this embodiment, each of the first connecting pads 420 electrically connected to the first touch electrodes 410a is bonded to the corresponding one of the third connecting pads 440a1 to 440a3, and under the control of the auxiliary switch elements AT, the first touch electrodes 410a are switchable between two modes, i.e., being electrically connected to each other or being not electrically connected to each other. Therefore, when the auxiliary switch elements AT receive the control signal CS for enabling, the touch capacitive signals of all the first touch electrodes 410a together can be received and processed by the detector 460a1, the detector 460a2, the detector 460a3, and the detectors 460g respectively at different timings. When the auxiliary switch elements AT do not receive the control signal CS, the touch capacitive signal of each of the first touch electrodes 410a can be received and processed by the detector 460a1, the detector 460a2, or the detector 460a3 at the corresponding timing, so as to obtain the touch information. For example, when the auxiliary switch elements AT receive the control signal CS, at the timing when the first switch element T61, each of the second switch elements T71, and the rightmost third switch element T81 are turned on, the touch capacitive signals of all the first touch electrodes 410a together can be transmitted through the third connecting pad 440a1 and the rightmost third connecting pad 440g1 to be received and processed by the detector 460a1 and the rightmost detector 460g. Moreover, when the auxiliary switch elements AT receive the control signal CS, at the timing when the two third switch elements T81 on the left side are turned on, the touch capacitive signals of all the first touch electrodes 410a together can be transmitted, optionally simultaneously or not simultaneously, through the two third connecting pads 440g1 on the left side to be received and processed by the two detectors 460g on the left side. When the auxiliary switch elements AT do not receive the control signal CS, at the timing when the first switch element T61 and each of the second switch element T71 are turned on, the touch capacitive signal of the first touch electrode 410a electrically connected to the third connecting pad 440a1 can be detected and processed by the detector 460a1.

The equation of capacitance is as follows: $C=\varepsilon*A/d$, wherein C represents a touch capacitance value, $\varepsilon$ represents the dielectric constant, A represents a touch electrode area, and d represents a distance between the touch device and the user or a conductive body for performing a touch operation. According to the equation, when the touch capacitance value and the touch electrode area are both increased, the user or the conductive body for performing a touch operation is able to execute the touch operation when there is a greater distance between the touch device and the user or the conductive body. In other words, when the touch capacitance value and the touch electrode area are both increased, the touch device is capable of hover touch and has a favorable hover touch capability. In this way, when the auxiliary switch elements AT receive the control signal CS, since the touch capacitive signals of all the first touch electrodes 410a together can be received and processed by a detector (the detector 460a1, the detector 460a2, the detector 460a3, and/or the detector 460g) at a timing or at multiple timings (i.e., the touch capacitance value and the touch electrode area are both increased), the touch device 40 may have a favorable hover touch capability.

As described above, since the touch device 40 is capable of hover touch when the auxiliary switch elements AT receive the control signal CS and the touch capacitive signal of each of the first touch electrodes 410a is respectively received and processed when the auxiliary switch elements AT do not receive the control signal CS, the touch device 40 is switchable between a hover touch mode and a normal touch mode according to whether the auxiliary switch elements AT are enabled or not in a method of driving the touch device 40. In the following, details about the hover touch mode and the normal touch mode will be described.

In this embodiment, driving the touch device 40 to execute the hover touch mode may include the following. The auxiliary switch elements AT are enabled, so that after all the first touch electrodes 410*a* are electrically connected to each other, a capacitance value change caused by all the first touch electrodes 410*a* together is detected, so as to execute hover touch. In this embodiment, driving the touch device 40 to execute the normal touch mode may include the following. Capacitance value changes of the first touch electrodes 410*a* and the second touch electrodes 110*b* are detected at the corresponding timings in a state where the auxiliary switch elements AT are disabled, so as to obtain the touch information.

Besides, when the hover touch mode is being executed, the touch capacitive signals of all the first touch electrodes 410*a* together can be received and processed by the corresponding detector (the detector 460*a*1, the detector 460*a*2, the detector 460*a*3, or the detectors 460*g*) respectively at different timings. In other words, the touch capacitive signals of all the first touch electrodes 410*a* together can be detected for multiple times. Therefore, even if the touch device 40 is applied to an in-cell touch display panel having a high resolution, the touch device 40 is still able to avoid a decrease in touch sensing accuracy.

Besides, in this embodiment, the auxiliary connecting pads 422 are bonded to the third connecting pads 440*g*1 of the driving circuit member 4IC. In this way, when the hover touch mode is being executed, the number of times that the touch capacitive signals of all the first touch electrodes 410 together are detected is increased with the circuit design of the multiplexer MUX. Nevertheless, the invention should not be construed as limited to the embodiments set forth herein. In other embodiments, the auxiliary connecting pads 422 may also be not bonded to the third connecting pads in the driving circuit member 4IC.

Besides, in this embodiment, the auxiliary switch elements AT are located between the auxiliary connecting pads 422 and the first touch electrodes 410*a*. However, the invention is not limited thereto. In other embodiments, the auxiliary switch elements AT may also be not located between the auxiliary connecting pads 422 and the first touch electrodes 410*a*. In the following, other variations are described in detail with reference to FIGS. 8 and 9. It should be noted that the reference numerals and a part of the contents in the previous embodiment are used in the following embodiments. Also, identical or similar reference numerals indicate identical or similar components, and repeated description of the same technical contents is omitted. For a detailed description of the omitted parts, reference can be found in the previous embodiment and these parts will not be further reiterated in the following.

Figure 8:
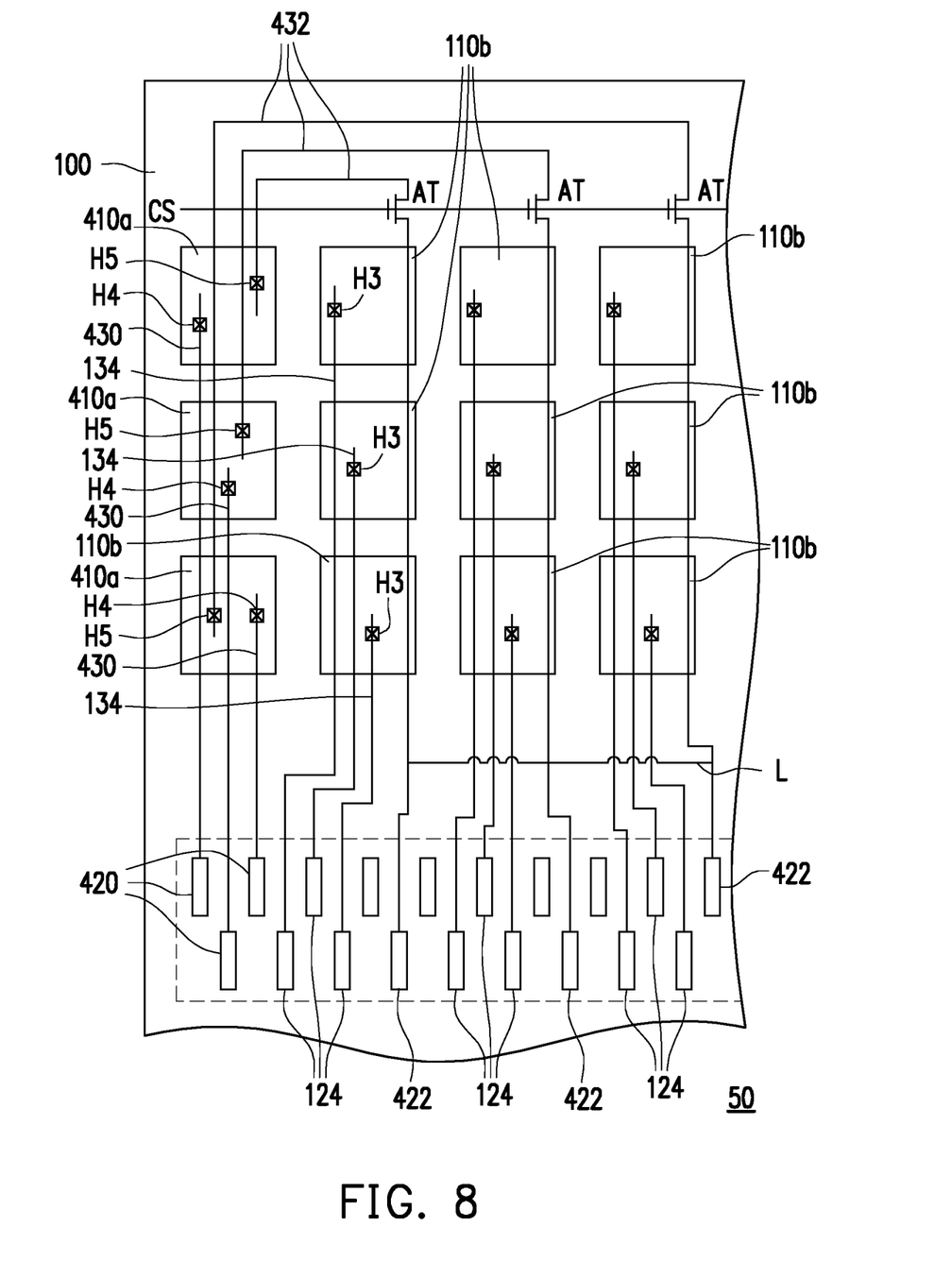
FIG. 8 is a schematic top view illustrating a touch device according to another embodiment of the invention.

FIG. 8 is a schematic top view illustrating a touch device according to another embodiment of the invention. Referring to FIGS. 8 and 6, a touch device 50 of FIG. 8 is similar to the touch device 40 of FIG. 6. Therefore, identical or similar components are indicated by identical or similar reference numerals, and repeated description of the same technical contents is omitted. For a detailed description of the omitted parts, reference can be found in the previous embodiment. It should be noted that, while the driving circuit member 4IC is omitted from FIG. 8, people having ordinary skill in the art shall understand that the touch device 50 of FIG. 8 includes the driving circuit member 4IC according to the description of the embodiment shown in FIGS. 6 and 7. The difference between the embodiments will be described in the following.

Referring to FIG. 8, in this embodiment, the first touch electrodes 410*a* are located between the auxiliary switch elements AT and the auxiliary connecting pads 422. Besides, in this embodiment, the first touch electrodes 410*a* are located between the interconnecting line L and the auxiliary switch elements AT.

Moreover, in this embodiment, each of the auxiliary connecting lines 432 electrically connects the corresponding first touch electrode 410*a* and the corresponding auxiliary connecting pad 422. However, the invention is not limited thereto. In other embodiments, each of the auxiliary connecting lines 432 may be not electrically connected to the auxiliary connecting pad 422. In the following, other variations are described in detail with reference to FIG. 9. It should be noted that the reference numerals and a part of the contents in the previous embodiment are used in the following embodiments. Also, identical or similar reference numerals indicate identical or similar components, and repeated description of the same technical contents is omitted. For a detailed description of the omitted parts, reference can be found in the previous embodiment and these parts will not be further reiterated in the following.

Figure 9:
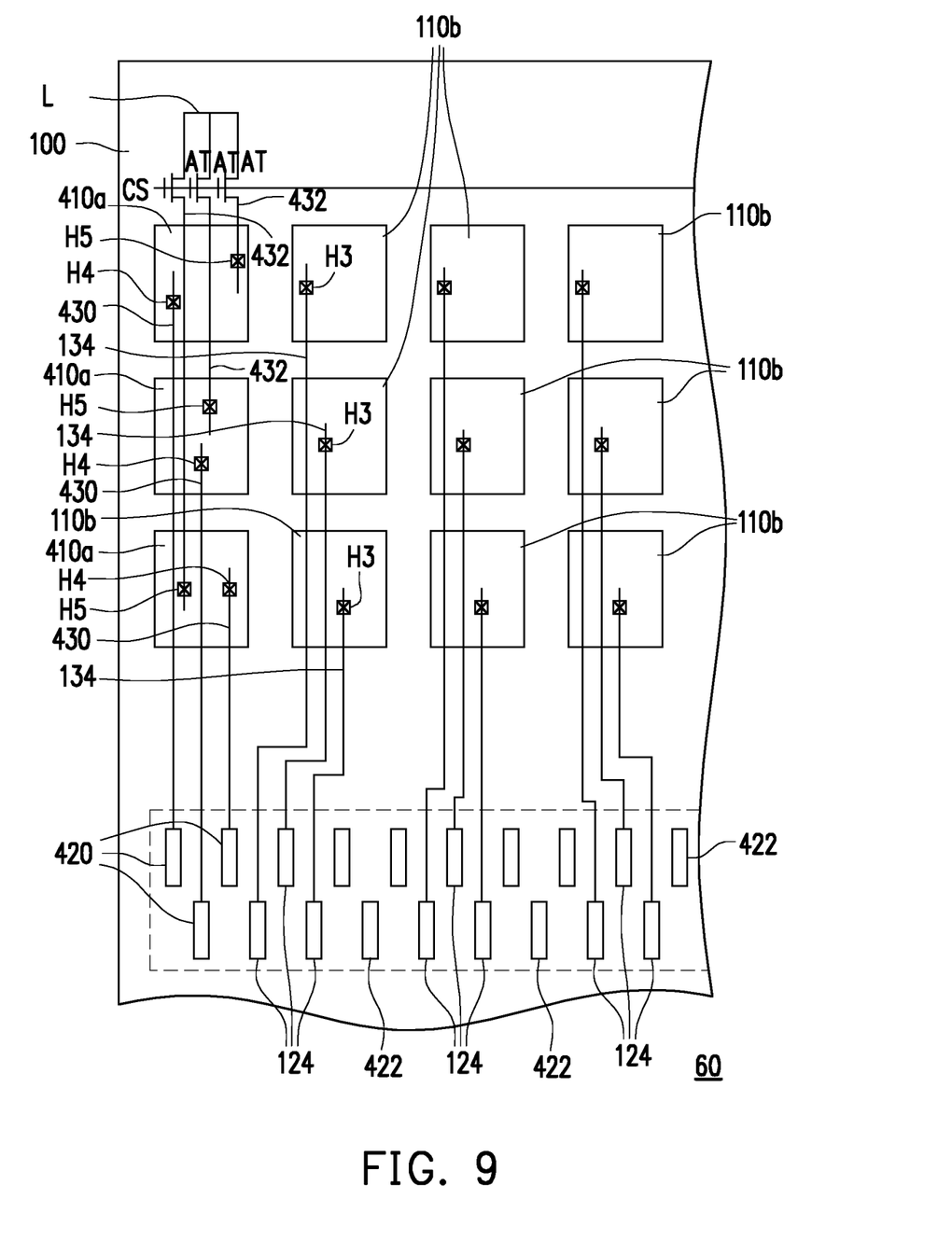
FIG. 9 is a schematic top view illustrating a touch device according to another embodiment of the invention.

FIG. 9 is a schematic top view illustrating a touch device according to another embodiment of the invention. Referring to FIGS. 9 and 8, a touch device 60 of FIG. 9 is similar to the touch device 50 of FIG. 8. Therefore, identical or similar components are indicated by identical or similar reference numerals, and repeated description of the same technical contents is omitted. For a detailed description of the omitted parts, reference can be found in the previous embodiment. It should be noted that, while the driving circuit member 4IC is omitted from FIG. 9, people having ordinary skill in the art shall understand that the touch device 60 of FIG. 9 includes the driving circuit member 4IC according to the description of the embodiment shown in FIGS. 6 and 7. The difference between the embodiments will be described in the following.

Referring to FIG. 9, in this embodiment, each of the auxiliary connecting lines 432 is electrically connected to the corresponding first touch electrode 410*a* via the contact hole H5, but each of the auxiliary connecting lines 432 is not electrically connected to the auxiliary connecting pad 422. Besides, in this embodiment, the auxiliary switch elements AT are located between the interconnecting line L and the first touch electrodes 410*a*.

Moreover, in the embodiments of FIGS. 6, 8, and 9, the touch devices 40, 50, and 60 may optionally adopt a single-sided, strip-like touch manner for executing the hover touch mode or the normal touch mode. In other words, the touch capacitive signals of all the first touch electrodes 410*a* in a strip-like arrangement can be jointly received and processed. The surface where all the first touch electrodes 410*a* are disposed may be different from the surface where all the second touch electrodes 110*b* are disposed. In other words, an included angle that is not 180° is formed between the surface where all the first touch electrodes 410*a* are disposed and the surface where all the second touch electrodes 110*b* are disposed. By applying such configuration to a touch device with an edge touch function, the user may operate the device even more conveniently, and the chance of erroneous touch is further reduced.

In view of the foregoing, in the touch device according to the embodiments, with the area of the first touch electrode being smaller than the area of each of the second touch electrodes and the first touch electrode being simultaneously electrically connected to the first main connecting pad and the first sub-connecting pad, the touch device is able to avoid a decrease in touch sensing accuracy even if the first touch electrode has a smaller area and/or the touch device is applied to an in-cell touch display panel having a high resolution. Moreover, in the touch device according to the embodiments, with the first touch electrodes being respectively electrically connected to the auxiliary connecting pads through the auxiliary switch elements and the auxiliary connecting pad being electrically connected to each other, the touch device is capable of hover touch and has a favorable hover touch capability.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch device, comprising:
a first touch electrode;
a plurality of second touch electrodes, wherein an area of the first touch electrode is smaller than an area of each of the second touch electrodes;
a first main connecting pad, electrically connected to the first touch electrode;
a first sub-connecting pad, electrically connected to the first touch electrode;
a plurality of second connecting pads, respectively electrically connected to the second touch electrodes; and
a multiplexer, comprising a main switch element and a sub-switch element, wherein a first end of the main switch element is electrically connected to the first main connecting pad, and a first end of the sub-switch element is electrically connected to the first sub-connecting pad.

2. The touch device as claimed in claim 1, further comprising:
a first main connecting line, electrically connecting the first touch electrode and the first main connecting pad; and
a first sub-connecting line, electrically connected to the first touch electrode and the first sub-connecting pad.

3. The touch device as claimed in claim 2, wherein the first sub-connecting line is electrically connected to the first main connecting pad and the first sub-connecting pad.

4. The touch device as claimed in claim 3, wherein the first main connecting pad and the first sub-connecting pad are substantially located between the first sub-connecting line and the first touch electrode.

5. The touch device as claimed in claim 3, wherein the first sub-connecting line is substantially located between the first sub-connecting pad and the first touch electrode.

6. The touch device as claimed in claim 1, wherein a control end of the main switch element is not electrically connected to a control end of the sub-switch element.

7. The touch device as claimed in claim 6, further comprising:
a plurality of controllers, respectively electrically connected to the control end of the main switch element and the control end of the sub-switch element; and
a plurality of detectors, respectively electrically connected to a second end of the main switch element and a second end of the sub-switch element.

8. The touch device as claimed in claim 7, wherein the multiplexer further comprises a first switch element, a control end of the first switch element is electrically connected to the control end of the main switch element, and a first end of the first switch element is electrically connected to one of the second connecting pads.

9. The touch device as claimed in claim 8, wherein the multiplexer further comprises a second switch element, a control end of the second switch element is electrically connected to the control end of the sub-switch element, and a first end of the second switch element is electrically connected to another one of the second connecting pads.

10. A touch device, comprising:
a plurality of first touch electrodes, respectively electrically connected to a plurality of auxiliary connecting pads through a plurality of auxiliary switch elements, wherein the auxiliary connecting pads are electrically connected to each other;
a plurality of first connecting pads, respectively electrically connected to the first touch electrodes via a plurality of first connecting lines;
a plurality of second touch electrodes;
a plurality of second connecting pads, respectively electrically connected to the second touch electrodes via a plurality of second connecting lines; and
a multiplexer, comprising a plurality of first switch elements and a plurality of second switch elements, wherein the first switch elements are respectively electrically connected to the first connecting pads, and the second switch elements are respectively electrically connected to the second connecting pads.

11. The touch device as claimed in claim 10, wherein the auxiliary switch elements are located between the auxiliary connecting pads and the first touch electrodes.

12. The touch device as claimed in claim 10, wherein the first touch electrodes are located between the auxiliary switch elements and the auxiliary connecting pads.

13. A method of driving a touch device, comprising:
providing the touch device according to claim 10; and
executing a hover touch mode, comprising:
enabling the auxiliary switch elements to electrically connect the first touch electrodes to each other.

14. The method of driving the touch device as claimed in claim 13, further comprising:
executing a normal touch mode, comprising:
disabling the auxiliary switch elements; and
detecting capacitance value changes of the first touch electrodes and the second touch electrodes.

15. A touch device, comprising:
a plurality of first touch electrodes;
a plurality of auxiliary switch elements, respectively electrically connected to the first touch electrodes;
an interconnecting line, electrically connecting first ends of the auxiliary switch elements;
a plurality of first connecting pads, respectively electrically connected to the first touch electrodes, wherein two of the first connecting pads are electrically connected through two of the first touch electrodes and two of the auxiliary switch elements;
a plurality of second touch electrodes;
a plurality of second connecting pads, respectively electrically connected to the second touch electrodes; and
a multiplexer, comprising a plurality of first switch elements and a plurality of second switch elements, wherein the first switch elements are respectively electrically connected to the first connecting pads, and the second switch elements are respectively electrically connected to the second connecting pads.

16. A touch device, comprising:
a first touch electrode;
a plurality of second touch electrodes, wherein an area of the first touch electrode is smaller than an area of each of the second touch electrodes;
a first main connecting pad, electrically connected to the first touch electrode;
a first sub-connecting pad, electrically connected to the first touch electrode;
a plurality of second connecting pads, respectively electrically connected to the second touch electrodes; and
a driving circuit member disposed in a driving circuit member bonding region,
wherein the first main connecting pad, the first sub-connecting pad and the second connecting pads are disposed in the driving circuit member bonding region, wherein the first touch electrode and the second touch electrodes are not in the driving circuit member bonding region, and wherein the driving circuit member is electrically connected with the first main connecting pad, the first sub-connecting pad and the second connecting pads.

17. A touch device, comprising:
a plurality of first touch electrodes, respectively electrically connected to a plurality of auxiliary connecting pads through a plurality of auxiliary switch elements, wherein the auxiliary connecting pads are electrically connected to each other;
a plurality of first connecting pads, respectively electrically connected to the first touch electrodes via a plurality of first connecting lines;
a plurality of second touch electrodes;
a plurality of second connecting pads, respectively electrically connected to the second touch electrodes via a plurality of second connecting lines; and
a driving circuit member disposed in a driving circuit member bonding region,
wherein the first connecting pads, the auxiliary connecting pads and the second connecting pads are disposed in the driving circuit member bonding region, wherein the first touch electrodes and the second touch electrodes are not in the driving circuit member bonding region, and wherein the driving circuit member is electrically connected with the first connecting pads, the auxiliary connecting pads and the second connecting pads.

18. A touch device, comprising:
a plurality of first touch electrodes;
a plurality of auxiliary switch elements, respectively electrically connected to the first touch electrodes;
an interconnecting line, electrically connecting first ends of the auxiliary switch elements;
a plurality of first connecting pads, respectively electrically connected to the first touch electrodes, wherein two of the first connecting pads are electrically connected through two of the first touch electrodes and two of the auxiliary switch elements;
a plurality of second touch electrodes; and
a plurality of second connecting pads, respectively electrically connected to the second touch electrodes; and
a driving circuit member disposed in a driving circuit member bonding region,
wherein the first connecting pads and the second connecting pads are disposed in the driving circuit member bonding region, wherein the first touch electrodes and the second touch electrodes are not in the driving circuit member bonding region, and wherein the driving circuit member is electrically connected with the first connecting pads and the second connecting pads.

* * * * *